(12) United States Patent
Funamizu et al.

(10) Patent No.: US 9,777,131 B2
(45) Date of Patent: Oct. 3, 2017

(54) METHOD FOR RECLAIMING USED SUPERABSORBENT POLYMER

(71) Applicants: National University Corporation Hokkaido University, Hokkaido (JP); Unicharm Corporation, Ehime (JP)

(72) Inventors: Naoyuki Funamizu, Hokkaido (JP); Ken Ushijima, Hokkaido (JP); Nowaki Hijikata, Hokkaido (JP); Hiroki Yoshikawa, Hokkaido (JP); Takayoshi Konishi, Kagawa (JP); Toru Oba, Kagawa (JP)

(73) Assignee: Unicharm Corporation, Ehime (JP)

( * ) Notice: Subject to any disclaimer, the term of this patent is extended or adjusted under 35 U.S.C. 154(b) by 108 days.

(21) Appl. No.: 14/386,910

(22) PCT Filed: Mar. 22, 2013

(86) PCT No.: PCT/JP2013/058288
§ 371 (c)(1),
(2) Date: Sep. 22, 2014

(87) PCT Pub. No.: WO2013/141357
PCT Pub. Date: Sep. 26, 2013

(65) Prior Publication Data
US 2015/0045461 A1    Feb. 12, 2015

(30) Foreign Application Priority Data
Mar. 23, 2012    (JP) .................................. 2012-068436

(51) Int. Cl.
   *C08J 11/06*    (2006.01)
   *B01J 20/34*    (2006.01)
   (Continued)

(52) U.S. Cl.
   CPC ............ *C08J 11/06* (2013.01); *B01J 20/3425* (2013.01); *B01J 20/3475* (2013.01); *B09B 3/00* (2013.01);
   (Continued)

(58) Field of Classification Search
   CPC .... C08J 11/06; C08J 2300/00; B01J 20/3475; B01J 20/3425; B01J 2220/68; B09B 3/00;
   (Continued)

(56) References Cited

U.S. PATENT DOCUMENTS 5,558,745 A *   9/1996   Conway .................. B29B 17/02
                                                                       134/26
2007/0119301 A1   5/2007   Abe
   (Continued)

FOREIGN PATENT DOCUMENTS

DE          19749039 A1    9/2001
JP           S 62-238802      10/1987
   (Continued)

OTHER PUBLICATIONS

International Search Report from corresponding PCT application No. PCT/JP2013/058288 dated Jun. 11, 2013 (4 pgs).

*Primary Examiner* — Frances Tischler
(74) *Attorney, Agent, or Firm* — Brinks Gilson & Lione

(57) ABSTRACT

A method enabling a used superabsorbent polymer recovered from used absorbent, etc., to be readily and inexpensively recovered without using acids or alkalies. The used superabsorbent polymer is treated with an aqueous solution of a multivalent metal salt such as calcium chloride, etc., the superabsorbent polymer treated with the aqueous solution of a multivalent metal salt is treated with an aqueous solution of an alkali metal salt such as sodium chloride, etc., the superabsorbent polymer treated with the aqueous solution of an alkali metal salt is washed with water, and the superabsorbent polymer washed with water is then dried.

8 Claims, 5 Drawing Sheets

FIG.2

(51) Int. Cl.
  *B09B 3/00* (2006.01)
  *B29L 31/48* (2006.01)
  *B29B 17/00* (2006.01)

(52) U.S. Cl.
  CPC ........... *B01J 2220/68* (2013.01); *B29B 17/00* (2013.01); *B29L 2031/4878* (2013.01); *C08J 2300/00* (2013.01); *Y02W 30/62* (2015.05)

(58) Field of Classification Search
  CPC . Y02W 30/62; B29B 17/00; B29L 2031/4878
  USPC ........................................................ 521/40
  See application file for complete search history.

(56) References Cited

U.S. PATENT DOCUMENTS

| | | |
|---|---|---|
| 2009/0191408 A1 | 7/2009 | Tian et al. |
| 2009/0192481 A1 | 7/2009 | Dodge, II et al. |

FOREIGN PATENT DOCUMENTS

| | | | |
|---|---|---|---|
| JP | 2002-058998 | A | 2/2002 |
| JP | 2002-346333 | A | 12/2002 |
| JP | 2003-225645 | S | 8/2003 |
| JP | 2003-326161 | A | 11/2003 |
| JP | 2005-270958 | A | 10/2005 |
| JP | 2011-511136 | A | 4/2011 |

\* cited by examiner

US 9,777,131 B2

METHOD FOR RECLAIMING USED SUPERABSORBENT POLYMER

RELATED APPLICATION

This application is a U.S.C. §371 national phase filing of International Patent Application No. PCT/JP2013/058288, filed Mar. 22, 2013, through which and to which priority is claimed under 35 U.S.C. §119 to Japanese Patent Application No. 2012-068436, filed Mar. 23, 2012.

TECHNICAL FIELD

The present invention relates to a method for reclaiming used superabsorbent polymer (SAP). In addition, the present invention relates to a method for recovering and reclaiming superabsorbent polymer from used absorbent products.

BACKGROUND ART

A mixture of pulp and superabsorbent polymer is frequently used for the absorbent body of absorbent products such as disposable diapers, incontinence pads, incontinence liners, sanitary napkins or panty liners. Studies have been conducted on methods for recovering and reclaiming superabsorbent polymers from used absorbent products and restoring their moisture absorbency so that they can be reused.

For example, Patent Document 1 discloses a method for restoring the moisture absorbency of a superabsorbent polymer contained in a used absorbent product by adding a transition metal salt only or a mixture of a transition metal salt, an alkali metal salt or an alkaline earth metal salt to a gelled mixture of a pulp component and a superabsorbent polymer, removing the moisture contained in the superabsorbent polymer, shrinking and solidifying the superabsorbent polymer together with coloring the superabsorbent polymer with a transition metal salt, followed by respectively separating and recovering the pulp component and superabsorbent polymer, recovering the transition metal salt, alkali metal salt or alkaline earth metal salt used in separation from the separated superabsorbent polymer by acid treatment, and treating the superabsorbent polymer with base following acid treatment.

PRIOR ART DOCUMENTS

Patent Documents

Patent Document 1: Japanese Unexamined Patent Publication No. 2003-225645

DISCLOSURE OF THE INVENTION

Problems to be Solved by the Invention

The method described in Patent Document 1 includes steps for acid treatment and alkaline treatment. Since acid and base cause corrosion of equipment, a method is desired that does not include a step for acid treatment or alkaline treatment. In addition, acid and base cause irritation of the skin. There is the risk of acid or base remaining in the reclaimed superabsorbent polymer in the case of not being completely neutralized during alkaline treatment following acid treatment. In the case of reusing a reclaimed superabsorbent polymer containing residual acid or base in a disposable diaper or other absorbent product, there is the problem of the acid or base causing irritation of the skin of the user.

The present invention provides a method for reclaiming used superabsorbent polymer, or in other words, provides a method for restoring the moisture absorbency of a used superabsorbent polymer, both easily and inexpensively without using acid or base.

Means for Solving the Problems

The inventors of the present invention unexpectedly found that the moisture absorbency of a superabsorbent polymer that has been dehydrated by treating with an aqueous multivalent metal salt solution can be restored simply by treating with an aqueous alkali metal salt solution without using acid or base, thereby leading to applicants's invention.

The present invention is a method for reclaiming used superabsorbent polymer, and includes a step for treating a used superabsorbent polymer with an aqueous multivalent metal salt solution and a step for treating the superabsorbent polymer with an aqueous alkali metal salt solution following treatment with the aqueous multivalent metal salt solution.

In addition, the present invention is a method for recovering and reclaiming superabsorbent polymer from a used absorbent product that includes a step for recovering the superabsorbent polymer from the used absorbent product, a step for treating the recovered superabsorbent polymer with an aqueous multivalent metal salt solution, a step for treating the superabsorbent polymer with an aqueous alkali metal salt solution following treatment with the aqueous multivalent metal salt solution, a step for washing the superabsorbent polymer with water following treatment with the aqueous alkali metal salt solution, and a step for drying the superabsorbent polymer after washing with water.

More specifically, the present invention is as indicated below.

[1] A method for reclaiming used superabsorbent polymer, including: a step for treating a used superabsorbent polymer with an aqueous multivalent metal salt solution, and a step for treating the superabsorbent polymer with an aqueous alkali metal salt solution following treatment with the aqueous multivalent metal salt solution.

[2] The method described in [1], wherein the multivalent metal salt is an alkaline earth metal salt.

[3] The method described in [2], wherein the aqueous alkaline earth metal salt solution contains 4.5 millimoles to 10 millimoles of an alkaline earth metal salt per 1 g of the superabsorbent polymer based on the dry weight thereof.

[4] The method described in any of [1] to [3], wherein the aqueous alkali metal salt solution contains 30 millimoles to 150 millimoles of an alkali metal salt per 1 g of the superabsorbent polymer based on the dry weight thereof.

[5] The method described in any of [1] to [4], further including a step for washing the superabsorbent polymer with water following treatment with the aqueous alkali metal salt solution.

[6] A method for recovering and reclaiming superabsorbent polymer from a used absorbent product, including: a step for recovering the superabsorbent polymer from the used absorbent product, a step for treating the recovered superabsorbent polymer with an aqueous multivalent metal salt solution, a step for treating the superabsorbent polymer with an aqueous alkali metal salt solution following treatment with the aqueous multivalent metal salt solution, a step for washing the superabsorbent polymer with water following treatment with the aqueous alkali metal salt solution, and a step for drying the superabsorbent polymer after washing with water.

EFFECTS OF THE INVENTION

According to the present invention, a used superabsorbent polymer can be reclaimed both easily and expensively without using acid or base.

BEST MODE FOR CARRYING OUT THE INVENTION

Figure 1:
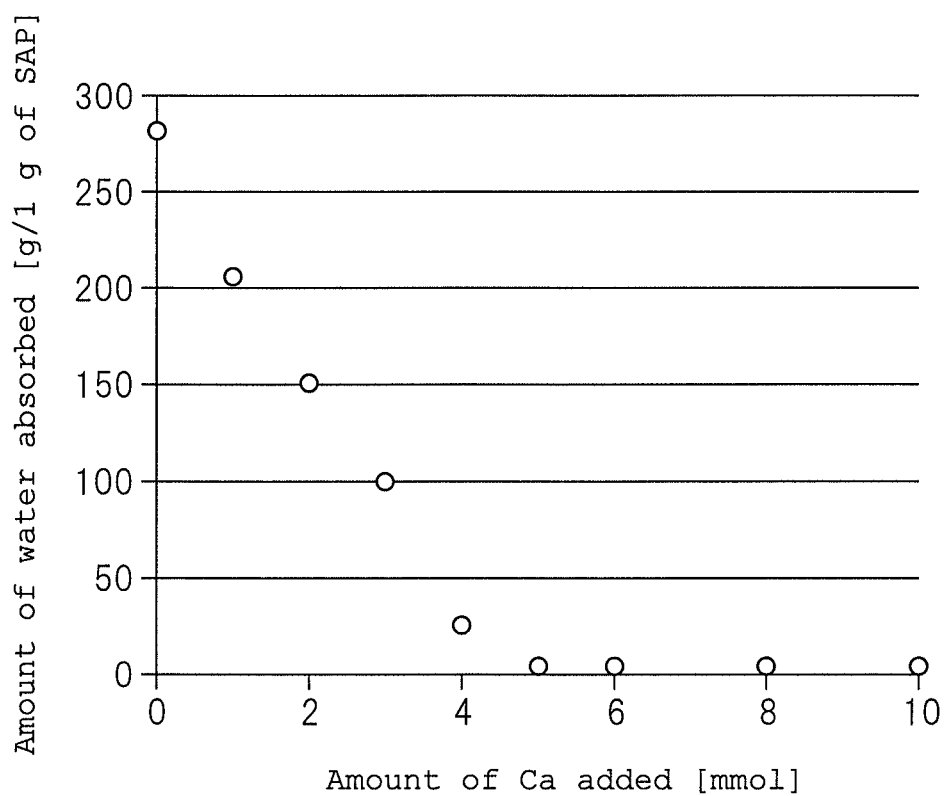
FIG. 1 indicates the amounts of water absorbed by an SAP following treatment with aqueous $CaCl_2$ solution.

The present invention is a method for reclaiming used superabsorbent polymer that includes a step for treating a used superabsorbent polymer with an aqueous multivalent metal salt solution, and a step for treating the superabsorbent polymer with an aqueous alkali metal salt solution following treatment with the aqueous multivalent metal salt solution.

Here, a used superabsorbent polymer refers to a superabsorbent polymer that has absorbed a liquid such as water regardless of the application of the superabsorbent polymer.

In addition, the present invention relates to a method for recovering and reclaiming superabsorbent polymer from a used absorbent product that includes a step for recovering the superabsorbent polymer from the used absorbent product, a step for treating the recovered superabsorbent polymer with an aqueous multivalent metal salt solution, a step for treating the superabsorbent polymer with an aqueous alkali metal salt solution following treatment with the aqueous multivalent metal salt solution, a step for washing the superabsorbent polymer with water following treatment with the aqueous alkali metal salt solution, and a step for drying the superabsorbent polymer after washing with water.

First, an explanation is provided of the step for treating the used superabsorbent polymer with an aqueous multivalent metal salt solution.

Superabsorbent polymers normally absorb moisture as a result of dissociation of sodium ions in a liquid, the oxygen atoms of carboxyl groups in the superabsorbent polymer taking on a negative charge, and water being attracted to the oxygen atoms having a negative charge. However, if cations of alkaline earth metals or transition metals having a valence of 2 or more are present in a liquid, oxygen atoms of carboxyl groups in the superabsorbent polymer bond with those cations resulting in a loss of moisture absorbency. Namely, by treating with an aqueous multivalent metal salt solution, water is released from the superabsorbent polymer, or in other words, the superabsorbent polymer can be dehydrated.

Examples of multivalent metal salts that can be used include alkaline earth metal salts and transition metal salts.

Examples of alkaline earth metal salts include water-soluble salts of beryllium, magnesium, calcium, strontium and barium. Preferable examples of alkaline earth metal salts include calcium chloride, calcium nitrate, magnesium chloride and magnesium nitrate, and calcium chloride is particularly preferable.

Examples of transition metal salts include water-soluble salts of iron, cobalt, nickel and copper, and although the salt of an inorganic acid, the salt of an organic acid or a complex and the like may be used provided it can be incorporated in an absorbent polymer, from the viewpoints of such factors as costs and availability, the salt of an inorganic acid or organic acid is preferable. Examples of salts of inorganic acids include iron salts such as iron chloride, iron sulfate, iron phosphate or iron nitrate, cobalt salts such as cobalt chloride, cobalt sulfate, cobalt phosphate or cobalt nitrate, nickel salts such as nickel chloride or nickel sulfate, and copper salts such as copper chloride or copper sulfate. Examples of salts of organic acids include iron lactate, cobalt acetate, cobalt stearate, nickel acetate and copper acetate.

The amount of the multivalent metal salt is preferably 4 millimoles or more, more preferably 4.5 millimoles to 10 millimoles, and even more preferably 5 millimoles to 8 millimoles per 1 g of superabsorbent polymer (based on the dry weight thereof). If the amount of the multivalent metal salt is excessively low, dehydration of the superabsorbent polymer is inadequate. If the amount of the multivalent metal salt is excessively high, since excess multivalent metal salt ions remain in the treatment solution without being incorporated in the superabsorbent polymer, the multivalent metal salt is wasted and treatment costs increase.

Although there are no particular limitations on the concentration of the multivalent metal salt in the aqueous multivalent metal salt solution provided it is a concentration that allows multivalent metal salt ions to be incorporated in the superabsorbent polymer, it is preferably 4 millimoles/liter or more, preferably 4.5 millimoles/liter to 10 millimoles/liter, and even more preferably 5 millimoles/liter to 8 millimoles/liter. If the concentration is excessively low, dehydration of the superabsorbent polymer is inadequate. If the concentration is excessively high, since excess multivalent metal salt ions remain in the treatment solution without being incorporated in the superabsorbent polymer, the multivalent metal salt is wasted and treatment costs increase.

Although there are no particular limitations on the duration of treatment with the aqueous multivalent metal salt solution provided it is a sufficient amount of time for allowing multivalent metal ions to be incorporated in the superabsorbent polymer, it is preferably 10 minutes or more, more preferably 20 minutes to 2 hours, and even more preferably 40 minutes to 90 minutes. If the treatment time is excessively short, dehydration of the superabsorbent polymer is inadequate. If the treatment time exceeds a certain value, since the amount of multivalent metal ions incorporated in the superabsorbent polymer becomes saturated, it is pointless for treatment time to exceed that value.

Although there are no particular limitations on the temperature of the aqueous multivalent metal salt solution provided it is a temperature that allows multivalent metal ions to be incorporated in the superabsorbent polymer, it is normally higher than 0° C. and lower than 100° C. Although room temperature is adequate for the temperature of the aqueous multivalent metal salt solution, the solution may also be heated to increase the reaction rate. In the case of heating, the temperature is preferably from room temperature to 60° C., more preferably from room temperature to 40° C., and even more preferably from room temperature to 30° C.

Next, an explanation is provided of the step for treating the superabsorbent polymer with an aqueous alkali metal salt solution following treatment with the aqueous multivalent metal salt solution.

Treatment with the aqueous alkali metal salt solution makes it possible to restore moisture absorbency of the superabsorbent polymer.

Furthermore, after having treated the superabsorbent polymer with the aqueous multivalent metal salt solution, the superabsorbent polymer is preferably supplied to the step for treating with the aqueous alkali metal salt solution without drying. If the superabsorbent polymer is allowed to dry prior to the step for treating with the aqueous alkali metal salt solution, there is the risk of it being difficult to restore the moisture absorbency of the superabsorbent polymer.

Examples of alkali metal salts that can be used include water-soluble salts of lithium, sodium, potassium, rubidium and cesium. Preferable examples of alkali metal salts include sodium chloride, potassium chloride, sodium nitrate, potassium nitrate, sodium sulfate and potassium sulfate, and among these, sodium chloride and potassium chloride are particularly preferable.

The amount of the alkali metal salt is preferably 20 millimoles or more, more preferably 30 millimoles to 150 millimoles, and even more preferably 40 millimoles to 120 millimoles per 1 g of superabsorbent polymer (based on the dry weight thereof). If the amount of the alkali metal salt is excessively low, restoration of the water absorbency of the superabsorbent polymer is inadequate. If the amount of the alkali metal salt is excessively high, since excess alkaline metal ions remain in the treatment solution without being incorporated in the superabsorbent polymer, the alkali metal salt is wasted and treatment costs increase.

Although there are no particular limitations on the concentration of the alkali metal salt in the aqueous alkali metal salt solution provided it is a concentration that allows multivalent metal ions to be released from the superabsorbent polymer, it is preferably 20 millimoles/liter or more, more preferably 30 millimoles/liter to 150 millimoles/liter, and even more preferably 40 millimoles/liter to 120 millimoles/liter. If the concentration is excessively low, restoration of the water absorbency of the superabsorbent polymer is inadequate. If the concentration is excessively high, since excess alkaline metal ions remain in the treatment solution without being incorporated in the superabsorbent polymer, the alkali metal salt is wasted and treatment costs increase.

Although there are no particular limitations on the duration of treatment with the aqueous alkali metal salt solution provided it is a sufficient amount of time for allowing multivalent metal ions to be released from the superabsorbent polymer, it is preferably 10 hours or more, more preferably 2 hours to 10 hours, and even more preferably 4 hours to 8 hours. If the treatment time is excessively short, restoration of the moisture absorbency of the superabsorbent polymer is inadequate. If the treatment time exceeds a certain value, since the amount of moisture absorbed by the superabsorbent polymer does not increase further, it is pointless for treatment time to exceed that value.

Although there are no particular limitations on the temperature of the aqueous alkali metal salt solution provided it is a temperature that allows multivalent metal ions to be released from the superabsorbent polymer, it is normally higher than 0° C. and lower than 100° C. Although room temperature is adequate for the temperature of the aqueous alkali metal salt solution, the solution may also be heated to increase the reaction rate. In the case of heating, the temperature is preferably from room temperature to 60° C., more preferably from room temperature to 40° C., and even more preferably from room temperature to 30° C.

The method of the present invention can also include a step for washing the superabsorbent polymer following treatment with the aqueous alkali metal salt solution.

Washing can be carried out by removing the superabsorbent polymer from the aqueous alkali metal salt solution, placing in a large amount of water and agitating. Washing can be carried out a plurality of times. Although there are no particular limitations on the water used for washing provided it does not contain components that impair restoration of the moisture absorbency of the superabsorbent polymer, pure water is preferable, and distilled water or ion exchange water can be used preferably.

Although there are no particular limitations on the amount of water used for a single round of washing, the duration of a single round of washing and the number of times washing is carried out provided they allow the concentration of the alkali metal salt remaining in the superabsorbent polymer after washing to be adequately lowered (namely, as long as the concentration does not have a detrimental effect in the application of the reclaimed superabsorbent polymer), the amount of water used for a single round of washing, for example, is preferably 0.4 L or more, more preferably 0.6 L to 2.0 L, and even more preferably 0.8 L to 1.5 L per 1 g of superabsorbent polymer (based on the dry weight thereof). The duration of a single round of washing is preferably 15 minutes or more, more preferably 30 minutes to 2 hours and even more preferably 45 minutes to 1 hour and 15 minutes. The number of times washing is carried out is at least one time, preferably two times and even more preferably three times. If the amount of water used for a single round of washing, the duration of a single round of washing or the number of times washing is carried out is excessively low, it is not possible to adequately lower the concentration of the alkali metal salt remaining in the superabsorbent polymer after washing. If the amount of water used for a single round of washing, the duration of a single round of washing or the number of times washing is carried out is excessively high, washing becomes uneconomical.

Although there are no particular limitations on the temperature of the water used for washing provided it is able to adequately lower the concentration of the alkali metal salt remaining in the superabsorbent polymer after washing, it is normally higher than 0° C. and lower than 100° C. Although room temperature is adequate for the temperature of the water used for washing, the water may also be heated to increase the reaction rate. In the case of heating, the temperature is preferably from room temperature to 60° C., more preferably from room temperature to 40° C., and even more preferably from room temperature to 30° C.

Although the above has provided an explanation of the method of the present invention using the example of carrying out the method using a batch type apparatus, the method of the present invention can also be carried out using a continuous flow type apparatus. In the case of carrying out the method of the present invention using a continuous flow type apparatus, the method can be carried out by, for example, filling a used superabsorbent polymer into a continuous flow type treatment tank, allowing the aqueous multivalent metal salt solution to flow into the continuous flow type treatment tank, discontinuing the supply of the aqueous multivalent metal salt solution after multivalent metal ions have been adequately incorporated in the superabsorbent polymer, next allowing the aqueous alkaline metal salt solution to flow into the treatment tank, discontinuing the supply of the aqueous alkaline metal salt solution after the majority of the multivalent metal ions have been released from the superabsorbent polymer, next allowing water to flow into the treatment tank for washing, discontinuing the supply of water after the alkaline metal salt concentration has adequately decreased, next allowing hot air to blow into the treatment tank for drying, discontinuing the supply of hot air once the superabsorbent polymer has adequately dried, and removing the superabsorbent polymer from the continuous flow type treatment tank.

An example of a superabsorbent polymer is a water-swellable crosslinked polymer obtained by polymerizing a hydrophilic monomer. Although there are no particular limitations on the structure or composition thereof, specific examples include partially neutralized, crosslinked polyacrylic acid polymers, crosslinked, partially neutralized starch-acrylic acid graft polymers, isobutylene-maleic acid copolymers, saponification products of vinyl acetate-acrylic acid copolymers, acrylamides and (co)polymer hydrolysates, acrylonitrile polymer hydrolysates and (meth)acrylamide derivatives. Among these, polyacrylate-based crosslinked polymers are preferable. 50 mol % to 90 mol % of the acid radicals in polyacrylate-based crosslinked polymers are preferably neutralized, and examples of salts include alkaline metal salts, ammonium salts and amine salts.

The method for recovering and reclaiming a superabsorbent polymer from a used absorbent product of the present invention includes a step for recovering the superabsorbent polymer from a used absorbent product.

Although examples of absorbent products include disposable diapers, incontinence pads, incontinence liners, sanitary napkins and panty liners, there are no particular limitations thereon provided they are absorbent products that contain a superabsorbent polymer. These absorbent products normally contain an absorbent body in the form of a mixture of a superabsorbent polymer and pulp.

Recovery of the superabsorbent polymer from the used absorbent product can be carried out by dismantling the absorbent product and removing the absorbent body containing the superabsorbent polymer. Although the superabsorbent polymer and pulp may be separated at this time, there are no particular limitations on the means used to separate the superabsorbent polymer and the pulp.

The method for recovering and reclaiming a superabsorbent polymer from a used absorbent product of the present invention includes a step for treating the recovered superabsorbent polymer with an aqueous multivalent metal salt solution. Although only the superabsorbent polymer that has been recovered and separated from the used absorbent article can be supplied to the step for treating with the aqueous multivalent metal salt solution, an absorbent body containing the superabsorbent polymer recovered from the used absorbent product (namely, the mixture of the superabsorbent polymer and pulp) may also be supplied to the step for treating with the aqueous multivalent metal salt solution. In the case of the latter, since the dehydrated superabsorbent polymer settles in the aqueous multivalent metal salt solution, the superabsorbent polymer can be separated from the pulp comparatively easily by settling separation and the like. In this case, the superabsorbent polymer obtained by settling separation is supplied to the next step for treating with the aqueous alkaline metal salt solution.

The reclaimed superabsorbent polymer can be reused in the absorbent body of an absorbent product. The reclaimed superabsorbent polymer can also be used in applications in which superabsorbent polymers are commonly used. For example, the reclaimed superabsorbent polymer can be used in applications including industrial absorbent products such as horticultural water sealing materials, civil engineering water sealing materials or optic cable water sealing materials, medical materials such as medical sheets, food freshness retaining materials and food drip absorbing materials.

EXAMPLES

[Treatment of Superabsorbent Polymer with Aqueous Calcium Chloride Solution]

1 g (dry weight) of superabsorbent polymer (Aqua Keep, Sumitomo Seika Chemicals Co., Ltd.) was weighed out and placed in a mesh case (in the form of a pouch measuring 200 mm×200 mm composed of 250 mesh nylon net (N-No. 250 HD, NBC Meshtec Inc.)). The superabsorbent polymer contained in the mesh case was agitated for 10 minutes in 1 L of distilled water to allow the superabsorbent polymer to absorb water. Calcium chloride (1, 2, 3, 4, 5, 6, 8 or 10 millimoles) was added to the distilled water followed by agitating for 1 hour. The mesh case was then removed from the distilled water and drained by suspending for 10 minutes. The amount of water absorbed by the superabsorbent polymer was then measured.

Furthermore, the amount of water absorbed per 1 g (dry weight) of the superabsorbent polymer (SAP) was calculated according to the equation below.

Weight of water contained in 1 g of SAP (dry weight) (g)=Total weight after draining−(weight of mesh case+weight of SAP 1 g)

In addition, special grade (JIS grade) reagents manufactured by Wako Pure Chemical Industries, Ltd. were used for all reagents used in the comparative examples and examples.

The results are shown in Table 1 and FIG. 1.

The amount of Ca added and the amount of water absorbed by the SAP demonstrated a nearly proportional relationship, with the amount of water absorbed decreasing as the added amount of Ca increased. In addition, water absorbency of the SAP was determined to be completely lost when 4.5 millimoles of Ca were added per 1 g of SAP (dry weight).

SAP that has lost the ability to absorb water as a result of being treated with an aqueous solution containing 4.5 millimoles or more of calcium chloride per 1 g of SAP (dry weight) is hereinafter referred to as "deactivated SAP".

TABLE 1

Amount of Water Absorbed by SAP Following Treatment with Aqueous $CaCl_2$ Solution

| Amt. of Ca Added (mmol) | Amt. of Water Absorbed (g/1 g SAP) |
|---|---|
| 0 (untreated) | 280 |
| 1 | 206 |
| 2 | 148 |
| 3 | 98 |
| 4 | 23 |
| 5 | 3.8 |
| 6 | 3.7 |
| 8 | 3.8 |
| 10 | 4 |

[Treatment of Deactivated SAP with Aqueous Alkaline Metal Salt Solution]

A mesh case containing 1 g (dry weight) of the deactivated SAP treated with 6 millimoles of calcium chloride in the aforementioned treatment with aqueous calcium chloride solution was placed in aqueous solutions respectively containing sodium chloride (10, 20, 30, 40, 50, 60 or 70 millimoles) and potassium chloride (10, 20, 30, 40, 50, 60 or 70 millimoles) in 1 L of distilled water followed by agitation. After 1, 2, 4 and 8 hours, the aqueous solutions were sampled followed by measurement of the amount of Ca using high-frequency inductively coupled plasma (ICP) atomic emission spectroscopy. After 8 hours, the mesh case was removed from the distilled water and agitated for 1 hour in 1 L of distilled water having a pH of 5.5. The mesh case was again placed in 1 L of distilled water having a pH of 5.5 and agitated for 1 hour. The mesh case was then removed and drained by suspending for 10 minutes. Subsequently, the amount of water absorbed by the SAP was measured.

Furthermore, calcium in the aqueous solutions was analyzed by high-frequency inductively coupled plasma atomic emission spectroscopy (ICP-AES) after diluting the aqueous solution samples 10-fold and adding 100 µL of 10N HCl.

Figure 2:
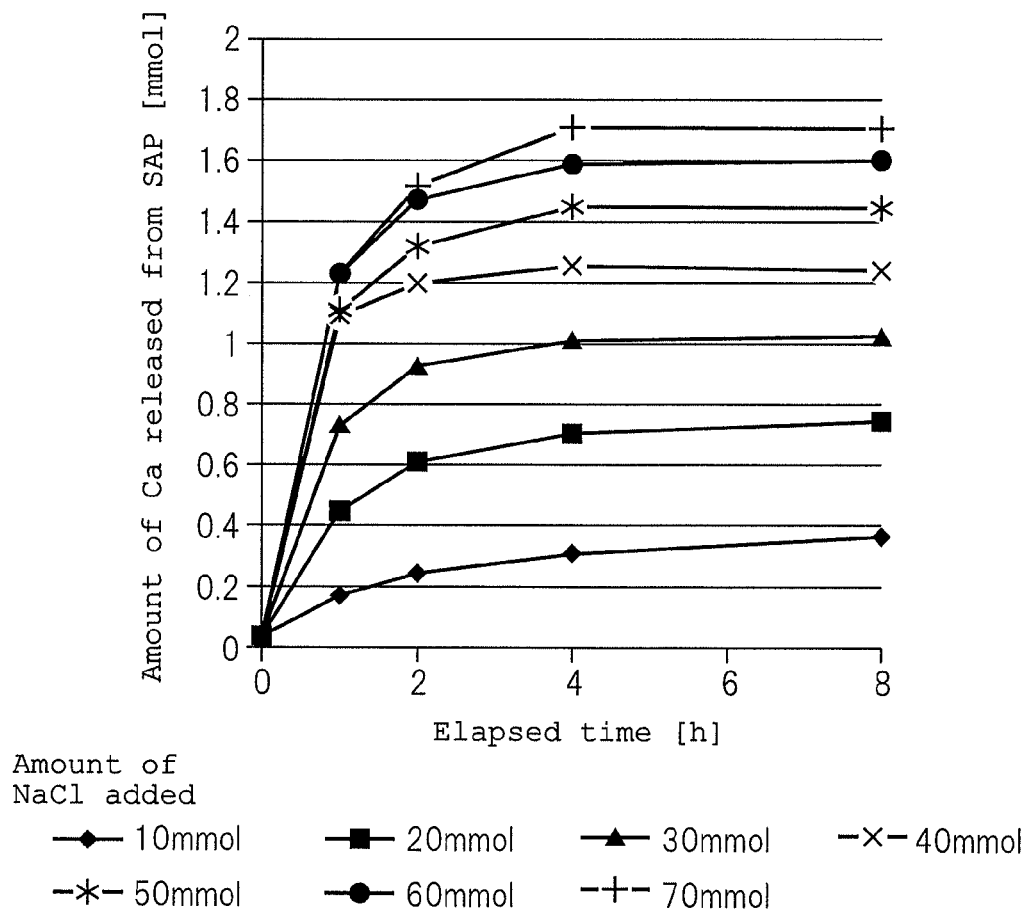
FIG. 2 indicates the amounts of Ca released from an SAP due to treatment with aqueous NaCl solution.

The amounts of Ca released from the SAP due to treatment with aqueous sodium chloride solution are shown in Table 2 and FIG. 2.

Figure 3:
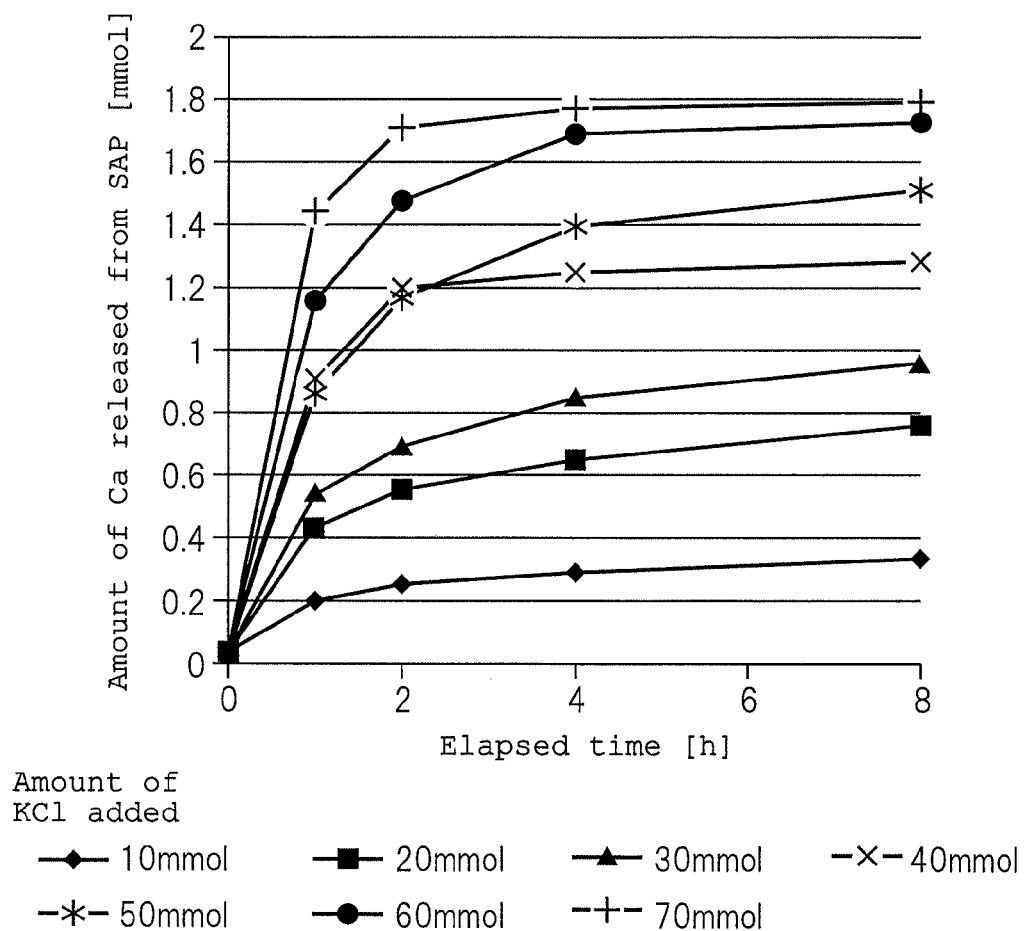
FIG. 3 indicates the amounts of Ca released from an SAP due to treatment with aqueous KCl solution.

The amounts of Ca released from the SAP due to treatment with aqueous potassium chloride solution are shown in Table 3 and FIG. 3.

Figure 4:
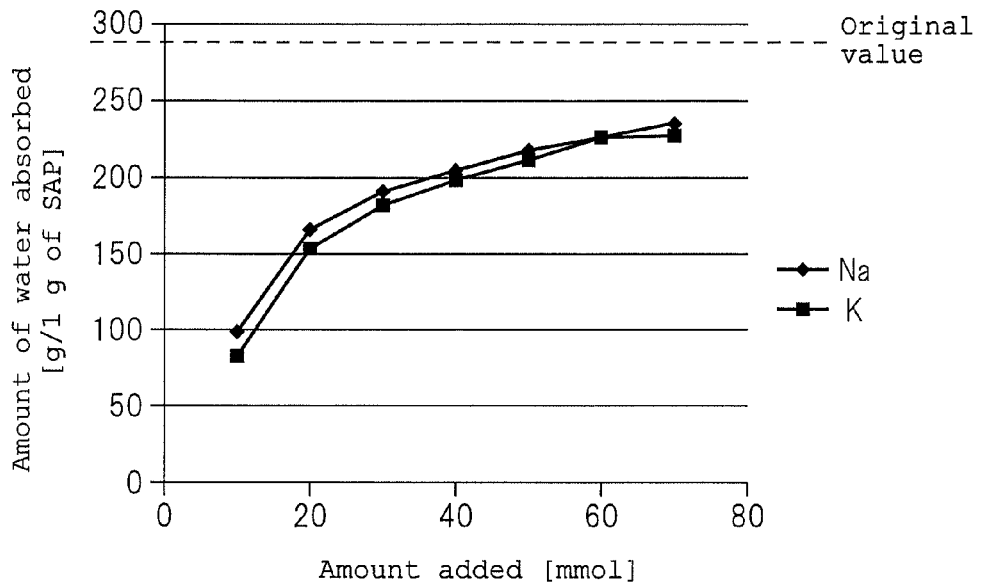
FIG. 4 indicates the amounts of water absorbed by an SAP following treatment with an aqueous solution of NaCl or KCl.

The amounts of water absorbed by the SAP following treatment with aqueous sodium chloride solution or aqueous potassium chloride solution are shown in Table 4 and FIG. 4.

In both the case of using sodium chloride and the case of using potassium chloride, release of Ca was observed simply by adding under neutral conditions. The amount of Ca released increased corresponding to the amounts of Na and K added. In addition, there were hardly any differences observed between Na and K with respect to the amount added and the amount of Ca released.

In both the case of using sodium chloride and the case of using potassium chloride, the amount of water absorbed by the SAP increased corresponding to the amount of Na and K added simply by adding under neutral conditions. In addition, there were hardly any differences observed between Na and K with respect to the amount added and the amount of water absorbed by the SAP. The amount of water absorbed increased rapidly when the amount added was from 10 millimoles to 20 millimoles. The amount of water absorbed increased linearly from 20 millimoles to 60 millimoles. Since the amount of water absorbed by the previously unused SAP is 280 g/g, the amount of water absorbed of the SAP recovered to about 80% of its original level when the added amount was 70 millimoles.

TABLE 2

Amount of Ca Released from SAP due to Treatment with Aqueous NaCl Solution

| Amt. of NaCl Added (mmol) | Amt. of Ca Released | | | |
|---|---|---|---|---|
| | After 1 hr | After 2 hr | After 4 hr | After 8 hr |
| 10 | 0.176 | 0.245 | 0.305 | 0.360 |
| 20 | 0.443 | 0.613 | 0.708 | 0.743 |
| 30 | 0.733 | 0.930 | 1.013 | 1.028 |
| 40 | 1.095 | 1.210 | 1.260 | 1.245 |
| 50 | 1.108 | 1.320 | 1.455 | 1.445 |
| 60 | 1.220 | 1.478 | 1.588 | 1.603 |
| 70 | 1.218 | 1.518 | 1.710 | 1.705 |

TABLE 3

Amount of Ca Released from SAP due to Treatment with Aqueous KCl Solution

| Amt. of KCl Added (mmol) | Amt. of Ca Released | | | |
|---|---|---|---|---|
| | After 1 hr | After 2 hr | After 4 hr | After 8 hr |
| 10 | 0.200 | 0.254 | 0.291 | 0.332 |
| 20 | 0.427 | 0.551 | 0.646 | 0.856 |
| 30 | 0.549 | 0.699 | 0.856 | 0.961 |
| 40 | 0.913 | 1.200 | 1.250 | 1.282 |
| 50 | 0.863 | 1.165 | 1.394 | 1.560 |
| 60 | 1.158 | 1.482 | 1.687 | 1.730 |
| 70 | 1.447 | 1.709 | 1.769 | 1.792 |

TABLE 4

Amount of Water Absorbed by SAP Following Treatment with Aqueous NaCl or KCl Solution

| Amt. of NaCl or KCl Added (mmol) | Amt. of Water Absorbed (g/1 g SAP) | |
|---|---|---|
| | NaCl Treatment | KCl Treatment |
| 10 | 98 | 81 |
| 20 | 166 | 153 |
| 30 | 191 | 182 |
| 40 | 204 | 199 |
| 50 | 218 | 211 |
| 60 | 226 | 226 |
| 70 | 235 | 227 |

[Acid Treatment of Deactivated SAP (Comparative Example)]

A mesh case containing 1 g (dry weight) of deactivated SAP treated with 6 millimoles of calcium chloride in the aforementioned treatment with aqueous calcium chloride solution was placed in an aqueous acidic solution obtained by adding hydrochloric acid to 1 L of distilled water and adjusting the pH to 1.5, 3, 4.5 or 6 and agitated. After 1, 2 and 4 hours, the aqueous solution was sampled and the amount of Ca was measured using high-frequency inductively coupled plasma atomic emission spectroscopy (ICP-AES). After 4 hours, the mesh case was removed from the solution and agitated for 1 hour in 1 L of distilled water at pH 5.5. The mesh case was again agitated for 1 hour in 1 L of distilled water at pH 5.5. The mesh case was then removed from the solution and drained by suspending for 10 minutes. Subsequently, the amount of water absorbed was measured.

Figure 5:
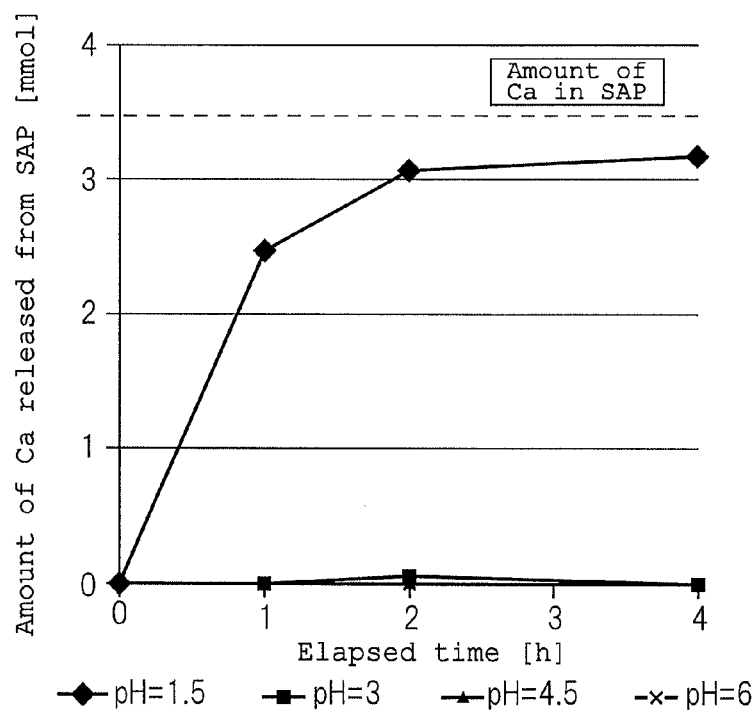
FIG. 5 indicates the amounts of Ca released from an SAP due to acid treatment.

The amounts of Ca released from the SAP due to acid treatment are shown in Table 5 and FIG. 5.

Figure 6:
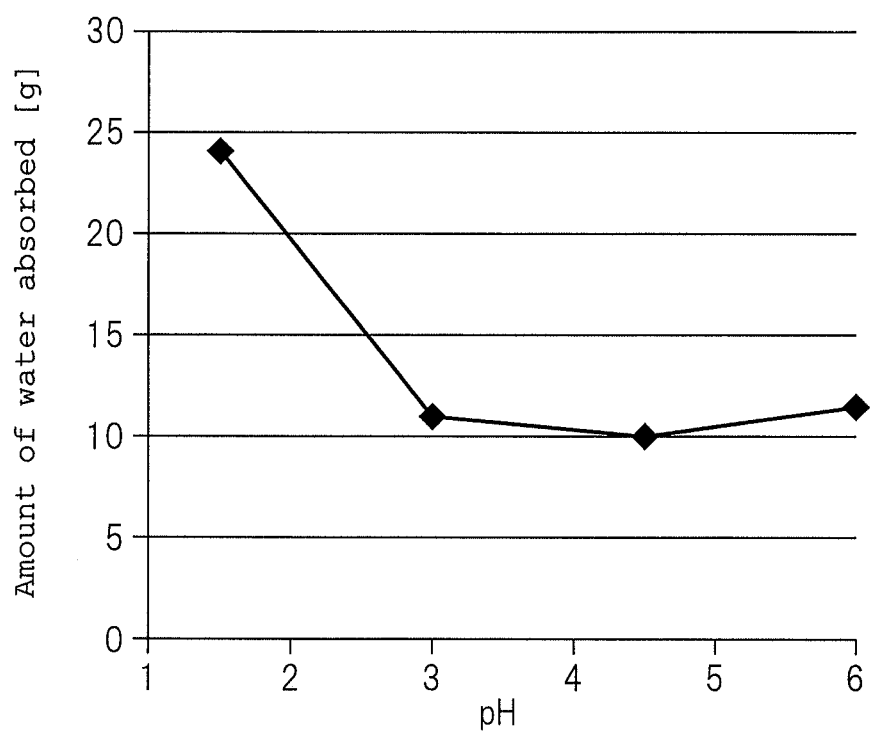
FIG. 6 indicates the amounts of water absorbed by an SAP following acid treatment.

The amounts of water absorbed by the SAP following acid treatment are shown in Table 6 and FIG. 6.

Ca in the SAP was only released in the case of a pH of 1.5, namely only under strongly acidic conditions. Although the deactivated SAP used in this test contained 3.6 millimoles of Ca per 1 g of SAP based on the dry weight thereof, the amount of Ca released under strongly acidic conditions was 3.3 millimoles, thus indicating that the majority of the Ca was released. In looking at this in terms of the amounts of water absorbed, the amounts of water absorbed were greater and increased restoration of moisture absorbency was observed at pH 1.5 that pH 3, 4.5 or 6. However, although moisture absorbency was expected to be restored to its original level in the vicinity of 280 g since the majority of the Ca was released, actual moisture absorbency was only on the order of 25 g, thereby indicating that moisture absorbency was not significantly restored. On the basis of the above, it was determined that the moisture absorbency of an SAP is not restored by release of Ca alone.

TABLE 5

Amounts of Ca Released from SAP due to Acid Treatment

| | Amt. of Ca Released (mmol) | | |
|---|---|---|---|
| pH | After 1 hr | After 2 hr | After 4 hr |
| 1.5 | 2.48 | 3.06 | 3.16 |
| 3 | 0.011 | 0.053 | 0.017 |
| 4.5 | 0 | 0 | 0 |
| 6 | 0 | 0 | 0 |

TABLE 6

Amounts of Water Absorbed by SAP Following Acid Treatment

| pH | Amt. of Water Absorbed(g/1 g SAP) |
|---|---|
| 1.5 | 24 |
| 3 | 11 |
| 4.5 | 10 |
| 6 | 11.5 |

INDUSTRIAL APPLICABILITY

Reclaimed superabsorbent polymers can be used in various applications including absorbent bodies of absorbent products as well as industrial absorbent products such as horticultural water sealing materials, civil engineering water sealing materials or optic cable water sealing materials, medical materials such as medical sheets, food freshness retaining materials and food drip absorbing materials.

The invention claimed is:

1. A method for reclaiming used superabsorbent polymer, comprising:
   a step of obtaining a mixture of used superabsorbent polymer and pulp, recovered from a used absorbent product;
   a step for treating the mixture of used superabsorbent polymer and pulp with an aqueous multivalent metal salt solution to dehydrate the superabsorbent polymer and separate the dehydrated superabsorbent polymer from the pulp, wherein the multivalent metal salt solution contains 4.5 millimoles to 10 millimoles of the multivalent metal salt per 1 g of the superabsorbent polymer based on the dry weight thereof and cations of the multivalent metal salt solution bond with oxygen atoms of carboxyl groups in the superabsorbent polymer to thereby release water from the superabsorbent polymer; and
   a step for treating the dehydrated superabsorbent polymer with an aqueous solution of at least one alkali metal salt selected from the group consisting of sodium chloride, potassium chloride, sodium nitrate, potassium nitrate, sodium sulfate and potassium sulfate to release multivalent metal ions from the superabsorbent polymer and restore moisture absorbency of the superabsorbent polymer,
   wherein the concentration of the alkali metal salt in the aqueous alkali metal salt solution is 30 to 150 millimoles/liter.

2. The method according to claim 1, wherein the multivalent metal salt is an alkaline earth metal salt.

3. The method according to claim 1, wherein the aqueous alkali metal salt solution contains 30 millimoles to 150 millimoles of an alkali metal salt per 1 g of the superabsorbent polymer based on the dry weight thereof.

4. The method according to claim 1, further comprising a step for washing the superabsorbent polymer with water following treatment with the aqueous alkali metal salt solution.

5. A method for recovering and reclaiming superabsorbent polymer from a used absorbent product, comprising:
   a step of recovering a mixture of superabsorbent polymer and pulp from a used absorbent product,
   a step for treating the mixture of superabsorbent polymer and pulp with an aqueous multivalent metal salt solution to dehydrate the superabsorbent polymer and separate the dehydrated superabsorbent polymer from the pulp, wherein the multivalent metal salt solution contains 4.5 millimoles to 10 millimoles of the multivalent metal salt per 1 g of the superabsorbent polymer based on the dry weight thereof, and oxygen atoms of carboxyl groups in the superabsorbent polymer bond with cations of the multivalent metal to thereby release water from the superabsorbent polymer,
   a step for treating the dehydrated superabsorbent polymer with an aqueous solution of at least one alkali metal salt selected from the group consisting of sodium chloride, potassium chloride, sodium nitrate, potassium nitrate, sodium sulfate and potassium sulfate to release multivalent metal ions from the superabsorbent polymer and restore moisture absorbency of the superabsorbent polymer,
   a step for washing the superabsorbent polymer with water following treatment with the aqueous alkali metal salt solution, and
   a step for drying the superabsorbent polymer after washing with water.

6. The method according to claim 2, wherein the aqueous alkali metal salt solution contains 30 millimoles to 150 millimoles of an alkali metal salt per 1 g of the superabsorbent polymer based on the dry weight thereof.

7. The method according to claim 2, further comprising a step for washing the superabsorbent polymer with water following treatment with the aqueous alkali metal salt solution.

8. The method according to claim 3, further comprising a step for washing the superabsorbent polymer with water following treatment with the aqueous alkali metal salt solution.

* * * * *